2 Sheets—Sheet 1.

W. E. SHARPLES.

SEPARATOR MECHANISM.

No. 11,562. Reissued Aug. 11, 1896.

Witnesses.
C. W. Smith
Giles P. Moore

Inventor
William E. Sharples
By Geo. W. Whiteley
Attorney

2 Sheets—Sheet 2.

W. E. SHARPLES.

SEPARATOR MECHANISM.

No. 11,562. Reissued Aug. 11, 1896.

Witnesses.
C. W. Smith
Gales P. Moore

Inventor
William E. Sharples
By Geo. H. Whittlesey
Attorney

UNITED STATES PATENT OFFICE.

WILLIAM E. SHARPLES, OF FALL RIVER, MASSACHUSETTS.

SEPARATOR MECHANISM.

SPECIFICATION forming part of Reissued Letters Patent No. 11,562, dated August 11, 1896.

Original No. 559,465, dated May 5, 1896. Application for reissue filed May 14, 1896. Serial No. 591,589.

*To all whom it may concern:*

Be it known that I, WILLIAM E. SHARPLES, a citizen of the United States, residing at Fall River, in the county of Bristol and State of Massachusetts, have invented certain new and useful Improvements in Separator Mechanism; and I do declare the following to be a full, clear, and exact description of the invention, such as will enable others skilled in the art to which it appertains to make and use the same, reference being had to the accompanying drawings, which form a part of this specification.

This invention relates to the separators used on ring-spinning frames; and its object is to improve the construction of the separator and also the mechanism for holding, adjusting, raising, and lowering the same.

Figure 1:
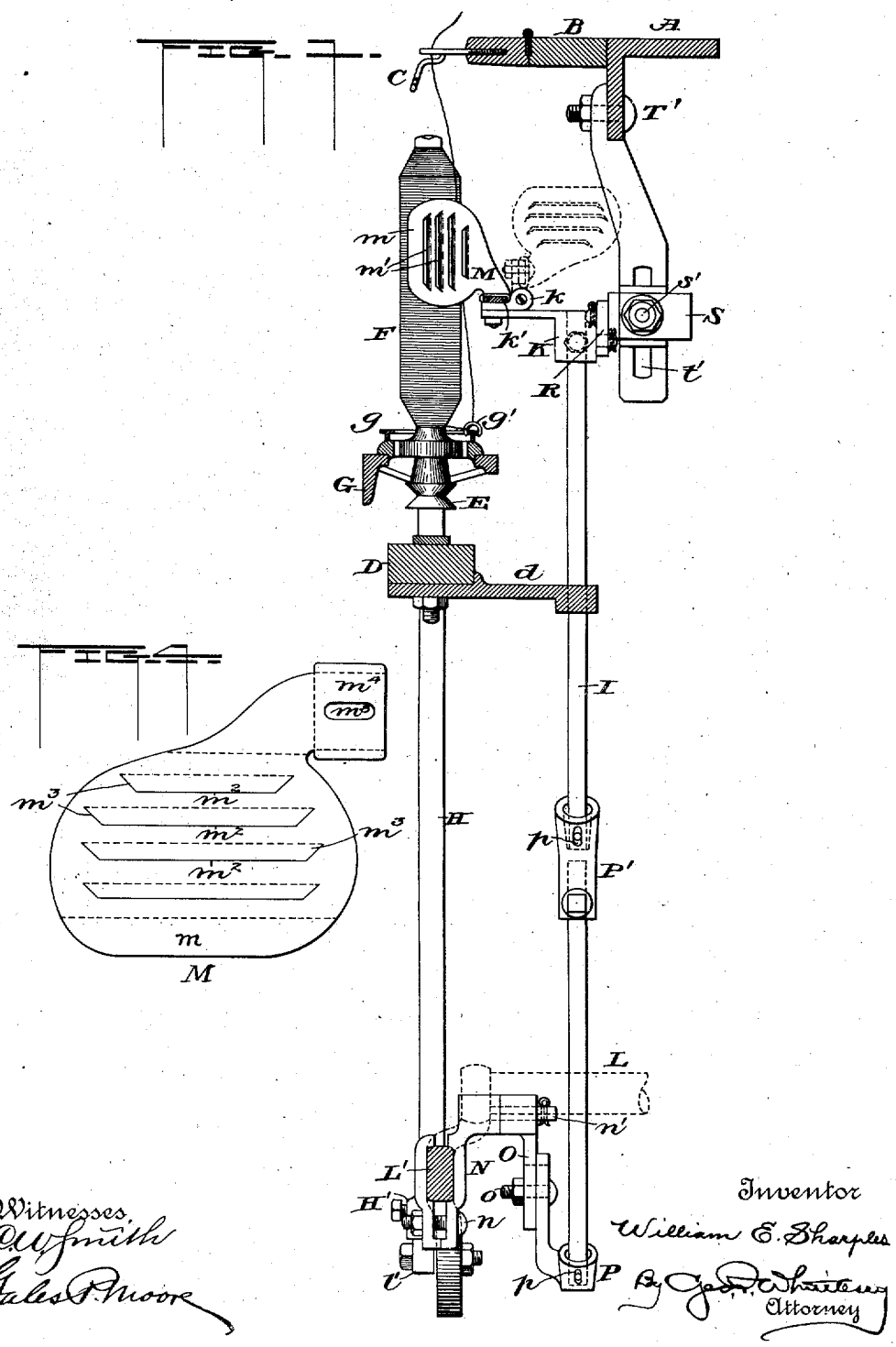
Figures 2, 3:
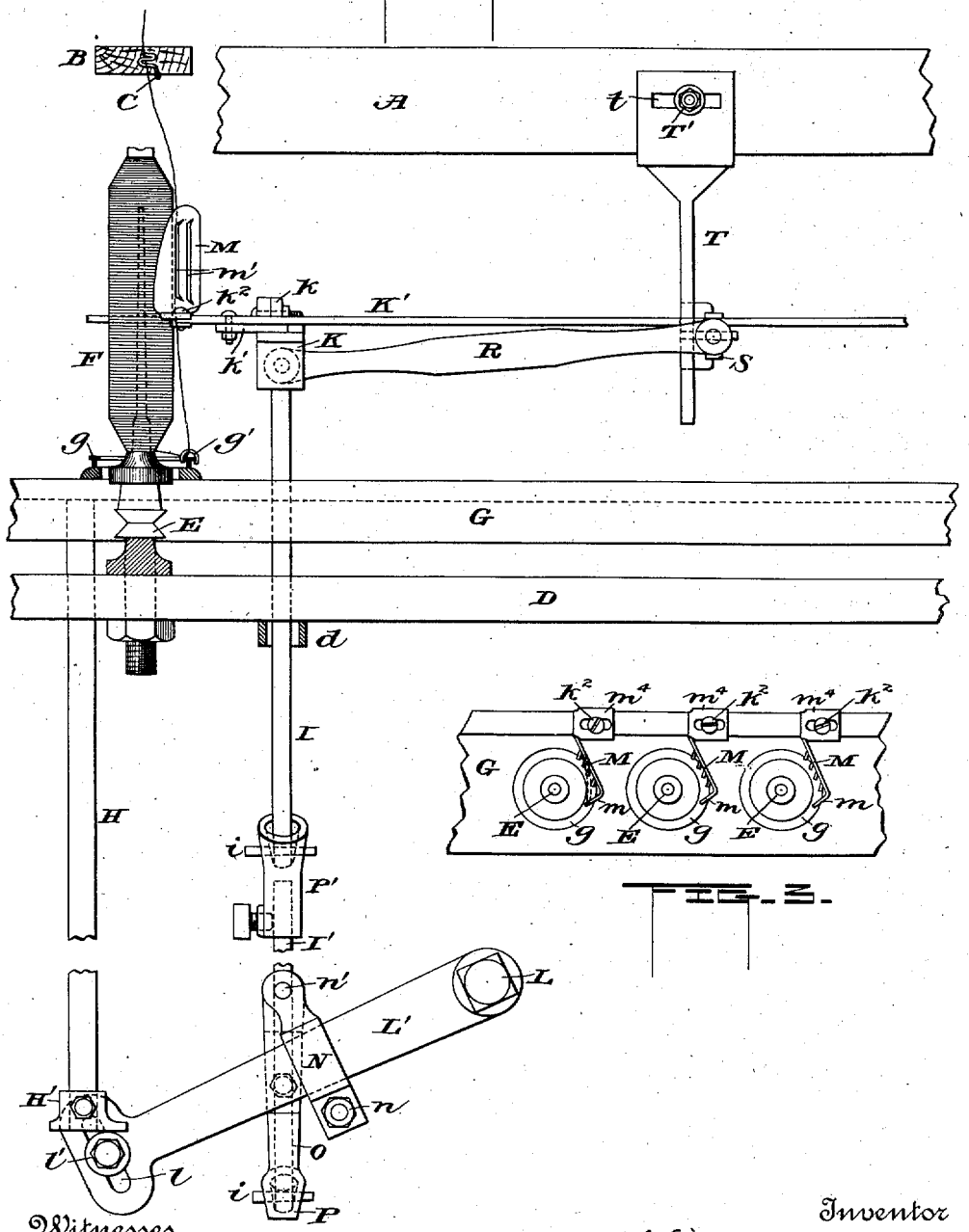

In the accompanying drawings, Figure 1 is a side elevation of a spindle of a ring-spinning frame, showing two separators and the mechanism for raising and lowering them. Fig. 2 is a rear elevation of a portion of the same machine. Fig. 3 is a top plan view of a portion of the ring-rail and separators. Fig. 4 is a detail view of the blank for one of the separators.

The roller-beam A, jointed thread-board B, guide-wire C, spindle-rail D, spindles E, bobbins F, mounted thereon, ring-rail G, carrying the ring $g$ and traveler $g'$, the lifting-rods H I, attached, respectively, to the ring-rail and the support K for the separator-bar K', and the rock-shaft L, from which said rods receive their motion, are all old and may be of any desired construction. The separator-bar K' is fastened to one leaf, $k'$, of a hinge, the other leaf, $k$, being attached to the support K. The bar can therefore be turned up into the position shown in dotted lines in Fig. 1. Each separator M is composed of a sheet of metal tangent to the bobbin and of a height preferably about two-fifths that of the bobbin. Its top and bottom are rounded, and its front edge is bent at a sharp angle to the blade of the separator, forming a flange $m$, approaching the bobbin. The blade of the separator is provided with a number of parallel inside ribs or bars $m'$, which are preferably substantially upright, as shown, though not necessarily so, it being sufficient if they are so arranged that their edges will oppose the passage of the thread, so as to strike or whip it. These may be of any suitable shape, such as corrugations or projections, or simply bars left between slots cut in the separator. I prefer to form them, as shown in Figs. 1, 2, 3, and 4, by cutting slits $m^2$ with a short angular slit $m^3$ at each end, thereby forming narrow leaves, which are bent inward toward the bobbin in the direction of the movement of the revolving thread, as clearly shown in Fig. 3. Integral with the blade of the separator is a foot $m^4$, which is preferably formed with flanges to fit down over the sides of the separator-bar K'. The separator is secured adjustably to the separator-bar by a set-screw $k^2$, passing through a slot $m^5$ in the foot $m^4$, whereby the separator can be adjusted along the bar toward or away from the bobbin.

The rock-shaft L carries a rock-arm L', in the end of which is a slot $l$ for the adjustment of a roller $l'$, on which rests the foot H', secured to the lower end of the ring-rail-lifting rod H. About midway of the rock-arm is a clamp N, composed of two parts held together by a bolt $n$ and clamping between them the rock-arm L'. One part of this clamp has a wrist-pin $n'$ engaging the upper end of the pitman O, which is made in two parts held together by a bolt $o$, so as to be adjustable in length. The lower portion of this pitman has a cup P, in which is stepped the lower end of a vertical rod I', which carries at its upper end a cup P', in which is stepped the lifting-rod I. The cavity in each cup is conical, so that the rods are permitted to rock on their steps. Each cup has a slot upon each side to receive the projecting ends of pins $i$, which are driven tightly into the rods. The slots permit the rods to rock, but prevent them from being accidentally unseated. The rod I reciprocates in a bearing in the arm $d$, attached to the spindle-rail D.

The upper ends of the separator-bar-lifting rods are connected by pivoted links R with blocks S, attached to the end of the hangers T, attached to the roller-beam A by screws T', passing through horizontal slots $t$, in order to provide for adjustment of the hangers and bars. The blocks S are vertically adjustable on the hangers by means of slots $t'$ and bolts $s'$.

Having thus described the several features of the construction, it remains to point out their functions and advantages.

The peculiar construction of the separator enables it to be set close to the inside diameter of the ring $g$, so that the thread in passing down from the guide-wire to the ring-traveler is kept in nearly a vertical line and is prevented from ballooning far from the bobbin. There is, in consequence, not so much drag on the thread, and a stronger and evener thread is produced. The object of the projections on the inner face of the separator-blades is to prevent the threads from whipping together by holding them for nearly one-half of the revolution around the bobbin. Furthermore, they operate to knock off any loose bunches of lint or foreign matter adhering to the thread, and a cleaner and smoother thread is made. The angular form of the separator enables it to control the thread for a longer portion of the revolution, and yet the separator does not project so far in front of the spindle as to interfere with the ready removal of the bobbin. It is evident that the separator may have more than one angle, and that it may even be curved to the segment of a circle, if desired, as indicated in dotted lines in Fig. 3.

The object of the pitman and the cupped steps P P′ for the separator-bar-lifting rods is to enable the rods to conform more easily to the changing positions of the rock-arms. The pins $i$ connect these parts together, so that the downward movement of the rods is in the main positive, the entire weight of the rods and separators assisting in the downward movement, so that there is but little danger, if any, of the rods sticking.

The adjustability of the clamp N on the rock-arm is for the purpose of changing the traverse of the separator-bar. Being attached between the shaft and the ring-rail-lifting rod, the movement of the separator-bar-lifting rod is slower and of less extent than that of the ring-rail rod. In coming down, the ring-rail gains on the separators, so that when it has reached its lowest position the separators stand some three inches above it, but not far enough to permit the threads to whip together. When the ring-rail is rising, the separator reaches its highest position in advance of the ring-rail, so that at all times the separator is never in contact with said rail.

The object of the links R is to guide and stiffen the separator-rods when the ring-rail is up to its highest position and prevent any movement endwise. It will be seen that the links swing in a plane parallel to the separator-bar, so that the separators move in arcs of circles in the direction of the length of the frame and toward and from the spindles.

Having thus described my invention, what I claim, and desire to secure by Letters Patent, is—

1. A separator-blade adapted to stand at one side of the bobbin, and having on its inner face a series of parallel projections arranged to oppose the passage of the thread, substantially as described.

2. A separator-blade adapted to stand at one side of the bobbin, and having on its inner face a series of inwardly-projecting leaves inclined in the direction of the movement of the thread arranged to oppose the passage thereof, substantially as described.

3. A separator-blade consisting of a sheet of metal adapted to stand at one side of the bobbin, and having a series of parallel leaves struck up from the body of the blade and inclined inwardly, substantially as described.

4. A separator-blade having a series of parallel slits with short angular slits at each end, the metal bounded by said slits being bent inwardly to form a series of projecting leaves, substantially as described.

5. A separator-blade having slits $m^2$, the angular slits $m^3$ at the end of the slits $m^2$, and the foot $m^4$ containing the slot $m^5$, substantially as described.

6. A separator-blade having on its inner face a series of parallel projections $m'$ arranged to oppose the passage of the thread, its outer edge being bent to form a flange $m$ adapted to project in over the ring-rail, substantially as described.

7. In a ring-spinning frame, the combination with the separator-bar, of the rock-shaft and rock-arm, a wrist-pin mounted adjustably on said rock-arm, a cup pivotally attached to and depending from said wrist-pin, and a separator-bar-lifting rod stepped in said cup, substantially as described.

8. In a ring-spinning frame, the combination with the separator-bar, of a rock shaft and arm, a two-part clamp attached to said arm and longitudinally adjustable thereon, and provided with a wrist-pin, a pitman pivoted on and depending from said wrist-pin, a cup at the end of said pitman, and a separator-bar-lifting rod stepped in said cup, substantially as described.

9. In a ring-spinning frame, the combination with the separator-bar, of a rock shaft and arm, a clamp mounted on said arm and longitudinally adjustable thereon and provided with a wrist-pin, a pitman pivoted on and depending from said wrist-pin, and composed of two parts adjustably secured together, a cup on the lower end of said pitman, and a separator-bar-lifting rod stepped in said cup, substantially as described.

10. In a ring-spinning frame, the combination with a separator-bar, of a lifting-rod therefor composed of two parts I I′, a cup P′ having a conical seat and slots $p$ mounted on the rod I′, and a pin $i$ rigidly attached to the rod I and projecting through the slots $p$, substantially as described.

11. In a ring-spinning frame, the combination with the separator-bar, of links pivotally attached to said bar and hung on horizontal pivots, whereby the separators are caused to move vertically in arcs of circles, substantially as described.

12. In a ring-spinning frame, the combination with the separator-bar, of links pivotally attached to said bar and swinging in a vertical plane parallel to that of the bar, substantially as described.

13. In a ring-spinning frame, the combination with the roller-beam, of a hanger adjustable horizontally along the same, a block S vertically adjustable on said hanger, a link R pivotally attached to said block on a horizontal axis and adapted to move in a vertical plane parallel with the roller-beam, a separator-bar pivotally attached to the other end of the link, and means for vertically moving the separator-bar, substantially as described.

In testimony whereof I hereunto subscribe my name in the presence of two witnesses.

WILLIAM E. SHARPLES.

Witnesses:

CHARLES L. FOOTE,

ARBA N. LINCOLN.